US007549398B2

(12) United States Patent
Robinson et al.

(10) Patent No.: US 7,549,398 B2
(45) Date of Patent: Jun. 23, 2009

(54) ADJUSTABLE WHEELCHAIR FOR PETS

(75) Inventors: Mark C. Robinson, Amherst, NH (US); Michael McGuire, Ottawa (CA); Roy Eng, Ottawa (CA)

(73) Assignee: Wheels for Pets, LLC, Amherst, NH (US)

( * ) Notice: Subject to any disclaimer, the term of this patent is extended or adjusted under 35 U.S.C. 154(b) by 130 days.

(21) Appl. No.: 11/874,555

(22) Filed: Oct. 18, 2007

(65) Prior Publication Data

US 2009/0101084 A1 Apr. 23, 2009

(51) Int. Cl.
*A01K 15/02* (2006.01)

(52) U.S. Cl. ...................................................... 119/727

(58) Field of Classification Search ................. 119/712, 119/724–727, 850; 280/657, 290
See application file for complete search history.

(56) References Cited

U.S. PATENT DOCUMENTS

| | | | | |
|---|---|---|---|---|
| 1,879,915 | A * | 9/1932 | Smoot | 119/725 |
| 2,546,726 | A | 3/1951 | Creamer, Jr. | |
| 2,976,840 | A | 3/1961 | Hugus | |
| 3,215,117 | A | 11/1965 | Short | |
| 3,241,851 | A * | 3/1966 | Dingbaum | 119/727 |
| 3,406,661 | A | 10/1968 | Parkes | |
| 4,375,203 | A | 3/1983 | Parkes | |
| 4,428,326 | A | 1/1984 | Dubovick et al. | |
| 4,449,481 | A * | 5/1984 | Dear et al. | 119/712 |
| 4,777,910 | A * | 10/1988 | Pecor | 119/727 |
| 4,796,903 | A * | 1/1989 | Proctor et al. | 280/87.051 |
| 4,821,676 | A | 4/1989 | Hulterstrum | |
| 5,224,444 | A | 7/1993 | Hill et al. | |
| 5,823,146 | A * | 10/1998 | Alaniz et al. | 119/725 |
| 6,820,572 | B1 | 11/2004 | Parkes | |
| 7,389,749 | B1 * | 6/2008 | Choate | 119/726 |

* cited by examiner

*Primary Examiner*—Kimberly S Smith
(74) *Attorney, Agent, or Firm*—Robert R. Deleault, Esq.; Mesmer & Deleault, PLLC

(57) ABSTRACT

A wheelchair for animals includes a harness support frame having first and second lateral supports spaced from each other and a width extender adjustably connected between the first and second lateral supports, first and second knuckle clamp assemblies where each one of the first and second knuckle clamp assemblies has a first clamp component and a second clamp component, a plurality of harness connectors attached to the harness support frame, first and second leg assemblies where the second clamp components receives a leg assembly proximal end of one of the first and second leg assemblies, first and second wheels where each one of the first and second wheels is rotatably connected adjacent to a leg assembly distal end of one of the first and second leg assemblies, and a harness assembly detachably connected to the harness support frame. Each first clamp component has a lateral bore for receiving one of the first and second lateral supports therethrough and is positioned between a support frame proximal end and a support frame distal end. Each second clamp component has a clamp recess that receives the leg assembly proximal end and is rotatably and adjustably connected to the corresponding first clamp component.

15 Claims, 10 Drawing Sheets

ADJUSTABLE WHEELCHAIR FOR PETS

BACKGROUND OF THE INVENTION

1. Field of the Invention

The present invention relates generally to walking aids for animals. Particularly, the present invention relates to mobile devices for disabled animals. More particularly, the present invention relates to mobile devices for injured or partially-immobilized animals such as cats and dogs.

2. Description of the Prior Art

Many dogs and cats lose the use of their hind legs through injury, illness, age, or obesity. Disabling medical conditions include inherited degenerative disorders, disc rupture and primary diseases of the nervous system. Unable to walk, romp about, or exercise, the animal often becomes lethargic giving rise to additional health and care problems. This is a terrible experience for the pet owner.

To address these concerns, many animal slings, supports and carts have been developed in the past. U.S. Pat. No. 6,820,572 (2004, Parkes) discloses a prosthetic apparatus for disabled four-legged animals. The apparatus is a cart with a chassis. The chassis includes a front subassembly detachably mounted to a rearward subassembly. A primary wheel is mounted to the frame of the chassis at each side of the rearward end and a set of swively mounted secondary wheels is mounted to the frame at each side of the forward end. A yoke extends across the frame at the forward end and is movable from an active position spanning the side walls of the frame to an inactive position away from one of the side walls to permit entrance and exit of the animal from the cart.

U.S. Pat. No. 5,224,444 (1993, Hill et al.) discloses a walking aid for a four-legged animal. The walking aid includes a cradle attachable below the animal's hind quarters, and a support member pivotally attached to the cradle. A wheel arrangement is provided on the support member at its end remote from the cradle. Resiliency is provided for biasing the support member below the cradle.

U.S. Pat. No. 4,821,676 (1989, Hulterstrum) discloses a cart assembly for a partially-immobilized animal. The cart assembly includes a plastic cradle adapted to support and partially encompass the hind portion of the animal, wheels connected to the plastic cradle for mobility, and a harness that is secured over the head of the animal and secured to the cradle.

U.S. Pat. No. 4,375,203 (1983, Parkes) discloses a prosthetic cart for animals. The cart has a yoke attachable to the animal's thorax, a hip support member for carrying the animal's rear quarters, a shin support for the animal's rear legs, and a pair of wheels. The cart also includes a pair of adjustment blocks that each has a plurality of axle holes. The axle is positioned with respect to the cart to approximate a balanced support of the rear quarters.

U.S. Pat. No. 3,406,661 (1968, Parkes) discloses an apparatus for suspending the hindquarters of a crippled household pet. The apparatus includes a standard formed of spaced shafts interconnected adjacent their upper ends and rotatably mounting a wheeled axle adjacent their lower ends, an upper and lower clamp device for each shaft, a shoulder unit formed of spaced parallel shafts having an integrally formed front yoke for embracing the shoulder area and providing spaced rear ends, and a suspension unit formed of spaced parallel shafts having an integrally formed lower abdominal sling merging into a pair of rear leg loops.

U.S. Pat. No. 3,215,117 (1965, Short) discloses a veterinary paraplegic cart. The cart includes an inverted U-shaped frame, wheels mounted on the frame, a shaped saddle bar adjustably secured to the frame, a preformed saddle secured to the saddle bar, a horizontal bar fitted to the front body area of the animal, rearwardly extending elongated rods with a fastening mechanism that is detachably connected to the horizontal bar and connected to the frame.

The prior art devices all suffer from various disadvantages. All of the prior art devices must be made to order and custom designed to the measurements of the animal. Some of the prior art devices can be adjusted based on the height and length of the animal but the wheel legs cannot be angularly adjusted relative to the horizontal axis of the device. Because they are custom-made, prior art carts cannot be returned or used on another animal unless the other animal has the same height, length and width measurements as the original animal for which the cart was made. In addition, the prior art carts tend to be bulky and more difficult to transport.

Therefore, what is needed is a wheelchair or cart for animals that is not custom designed and made. What is also needed is a wheelchair or cart for animals that is re-usable. What is further needed is a wheelchair or cart for animals that can be easily collapsed for transportation.

SUMMARY OF THE INVENTION

It is an object of the present invention to provide a wheelchair for animals that is standardized yet adjustable. It is another object of the present invention to provide a wheelchair for animals that is adjustable in three dimensions, that is, height, width and length. It is a further object of the present invention to provide a wheelchair for animals that is collapsible for transport. It is still another object of the present invention to provide a wheelchair for animals that is adjustable by the end user. It is yet another object of the present invention to provide a wheelchair for animals that has angularly-adjustable wheel legs relative to the horizontal axis of the wheelchair.

The present invention achieves these and other objectives by providing a wheelchair for animals having a harness support frame, first and second knuckle clamp assemblies, a plurality of harness connectors, first and second leg assemblies, and first and second wheels attached adjacent to the distal end of the first and second leg assemblies. The harness support frame is generally U-shaped and includes first and second lateral supports spaced from each other with a width extender adjustably connected between the first and second lateral supports at or adjacent to a proximal end (i.e. the end forming the base of the "U" shape) of the harness support frame.

The first and second knuckle clamp assemblies have a first clamp component and a second clamp component that adjustably interlock to provide for selective circumferential positioning of the second clamp component relative to the first clamp component. It is the knuckle clamp assembly that provides the collapsibility of the wheelchair for transportation as well as the angular adjustment of the leg assembly relative to the harness support frame. Each of the first clamp components has a lateral bore sized to slidably and matingly receive one of the first and second lateral supports therethrough. The first clamp component also includes a locking mechanism to securely position the first clamp component in a desired location along the lateral support to accommodate the length of a particular animal. The second clamp component has a clamp recess for securely receiving the leg assembly.

The plurality of harness connectors is positionable, yet securely fixable, in various locations on the harness support frame. This flexibility provides for accommodating various types of animal harnesses that are configured for a particular ailment or injury. For instance, the harness for an animal with a broken leg is structurally different than a harness for a paraplegic animal since the support requirements are different. The adjustable positioning of the plurality of harness connectors is designed to accommodate these different requirements without the need to custom make each harness support frame.

First and second leg assemblies are removably connected to the second clamp component of the knuckle clamp assemblies. Preferably, the clamp recess of the second clamp component receives in sliding and mating engagement a proximal end of the leg assemblies. The proximal end of the leg assemblies is secured to the second clamp component to prevent inadvertent or accidental disconnection of the leg assemblies from the knuckle clamp assemblies. A wheel is rotatably connected adjacent to each of the distal ends of the leg assemblies. The wheels may be sized for the terrain, for example, a larger diameter wheel for soft sand or uneven terrain and a smaller diameter wheel for hard surfaces.

The leg assemblies may optionally include leg extenders that are preferably telescopically connected to the distal end of the leg assemblies. When leg extenders are optionally included, a leg lock mechanism is employed to securely lock the leg extender at a pre-selected position depending on the height of the animal being fitted and the diameter of the wheels used on the leg assemblies. The wheels are then rotatably connected adjacent to the distal end of the leg extender. The leg lock mechanism may be a button and hole device, a twist and lock device, a collar mechanism, a locking pin, or a set screw, and the like. The button and hole device is a biased "button" or pin that mates with a locking hole in the leg assembly. The biasing mechanism forces the "button" or pin into a hole in the leg assembly with which it is aligned. The twist and lock device is typically a compression-type fitting on the leg assembly that surrounds the leg extender and compressibly holds the leg extender at a pre-selected and extended position. This type of mechanism is used on adjustable ski poles. An optional set screw may be incorporated in the leg assembly to prevent inadvertent or accidental disengagement of the leg lock mechanism.

The width extender of the harness support frame, like the leg extender, is preferably telescopically connected to the first and second lateral supports at the proximal end of the harness support frame. A frame lock mechanism is employed to securely lock the width extender at a pre-selected position, depending on the width of the animal. As with the leg extender, the frame lock mechanism for the width extender may be a button and hole device, a twist and lock device, a collar mechanism, a locking pin, or a set screw, and the like. An optional set screw may also be incorporated in the first and second lateral supports to prevent the inadvertent or accidental disengagement of the frame locking mechanism.

The harness support frame may optionally include first and second lateral extenders at the distal end of the first and second lateral supports. The lateral extenders are preferably telescopically connected to the first and second lateral supports. A lateral lock mechanism is also preferably employed to securely lock the lateral extenders at a pre-selected position, depending on the length of the animal. As previously explained, the lateral lock mechanism may take any form that securely locks the lateral extender at a pre-selected extension. Examples of some of these devices include a button and hole device, a twist and lock device, a collar mechanism, a locking pin, a set screw, and the like. An optional set screw may also be incorporated for the same reasons as stated above for the previously described extenders.

On any of the extender components, i.e. width extender, lateral extender and leg extender, indicia may be incorporated or applied thereon to facilitate proper sizing for a range of animal dimensions. These indicia may be actual measurement marks such as inches or centimeters, or they may be color coded with a color coding chart designed specifically for various animal sizes (i.e. small, medium and large or height, width and length). Also, the color coding may be used for proper selection of the extenders that accommodate animals within a predefined size range as well as for ease of assembly. By way of example for ease of assembly, the leg extenders may have indicia that match indicia on the leg assembly while the lateral extenders may have a different indicia that matches the first and second lateral supports. Similarly, the plurality of harness connectors may also have indicia or the harness support frame may have indicia to easily select placement of the harness connectors on the harness support frame depending on the harness to be used and the size of the animal.

The present invention may also include optional features such as (1) a foot stabilizer that attaches to the leg assembly and extends away from the leg assembly to prevent over-rotation of the harness frame support relative to the wheels, (2) a stabilizer bar that attaches between the lateral supports and extends above the harness frame support to accommodate the body of the animal, to stabilize the lateral extenders and to provide an assist handle for use by the animal's keeper, and (3) a shock absorber connected to the leg assemblies to dampen wheel impacts.

Adjustability is the key characteristic of the present invention. This key characteristic includes the ability to adjust the length of the harness support frame, the width of the harness support frame, the height of the harness support frame, and the collapsibility of the rotatable knuckle clamp assemblies allowing the leg assemblies to rotate and be positioned parallel with the harness support frame for easy transportation. The rotatable knuckle clamp assemblies also provides angular adjustment of the leg assemblies relative to the harness support frame. This adjustability eliminates the need for custom designing a wheelchair/cart for a particular animal. It also eliminates the need for accurate measurements of the animal in order to obtain the custom designed wheelchair/cart. The present invention's adjustability allows the end user to make the necessary adjustments for the end user's animal. It further provides an economic advantage since the present invention can be easily adjusted to fit various size animals making the device re-usable. Thus, the same wheelchair or cart, since it is not custom made, can be re-sold or leased. Further, the adjustability of the present invention eliminates or minimizes the need to purchase a new wheelchair or cart if the animal outgrows it. A simple readjustment is typically all that is required.

DETAILED DESCRIPTION OF THE PREFERRED EMBODIMENT

Figure 1:
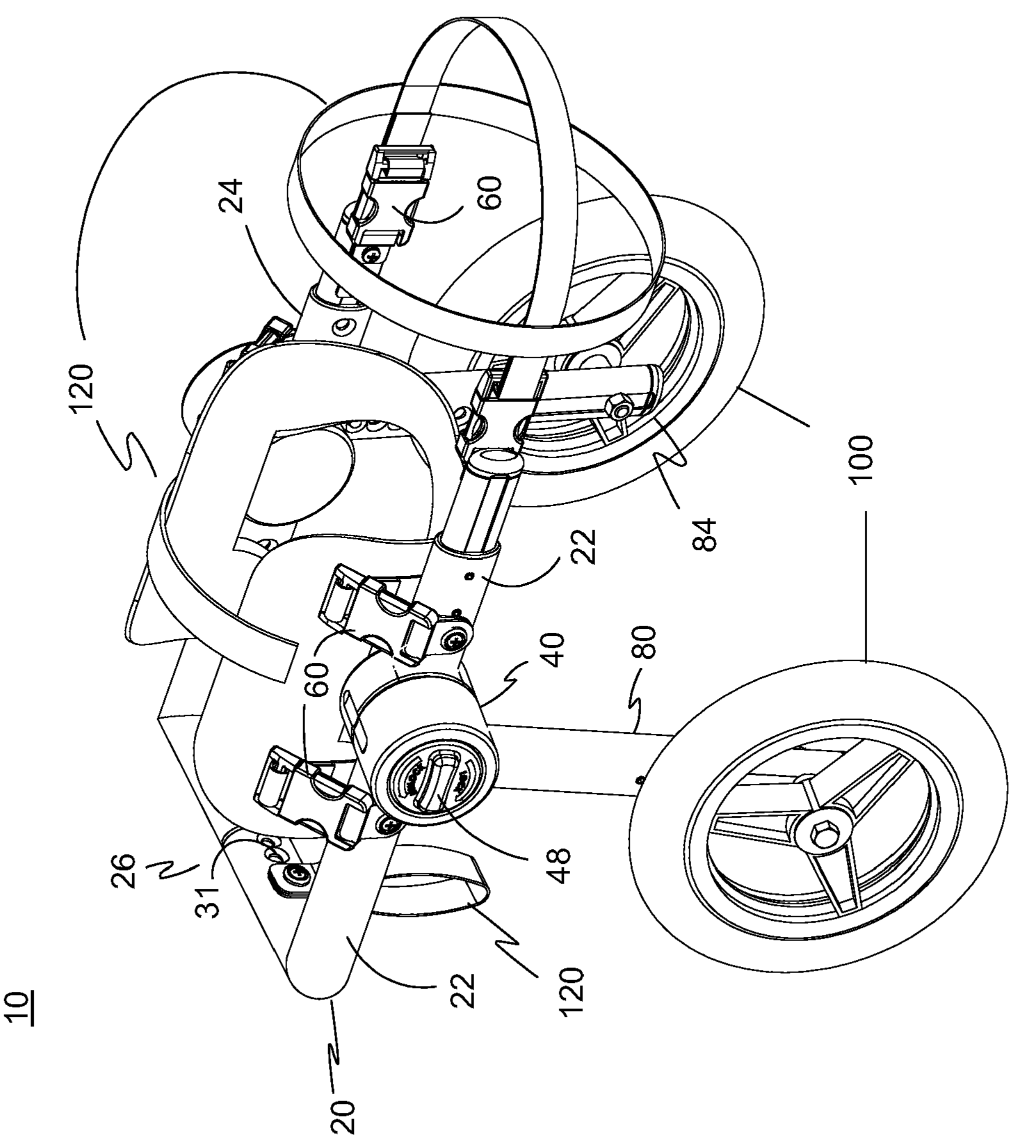
FIG. 1 is a perspective front view of the present invention showing an adjustable wheelchair for four-legged animals.

The preferred embodiment(s) of the present invention is illustrated in FIGS. 1-10. The wheelchair for four-legged animals 10 is shown in FIG. 1. Wheelchair 10 includes a harness support frame 20, a first and second knuckle clamp assembly 40, a plurality of harness connectors 60, first and second leg assemblies 80, first and second wheels 100 attached adjacent to the distal end 90 of first and second leg assemblies 80, and a harness assembly 120. Harness support frame 20 includes first and second lateral supports 22, 24 that are spaced from each other. First and second lateral supports 22, 24 are connected to each other at frame proximal end 26 by a width extender 28 (shown in FIG. 2). Proximal end 26 gives harness support frame 20 a U-shaped structure that typically receives the hindquarters of an animal needing support. First and second lateral supports 22, 24 include a plurality of apertures 31 that are used in conjunction with a spring button for adjusting the length and width of harness support frame 20. Harness assembly 120 includes any subcomponent that connects harness support frame 20 to an animal or supports a portion of the animal's body. First and second knuckle clamp assembly has a locking component 48. Harness assembly 120 includes a harness hindquarter component 122, a harness leg support 124 and an animal body harness 126, which are more clearly delineated in FIG. 3.

Figure 2:
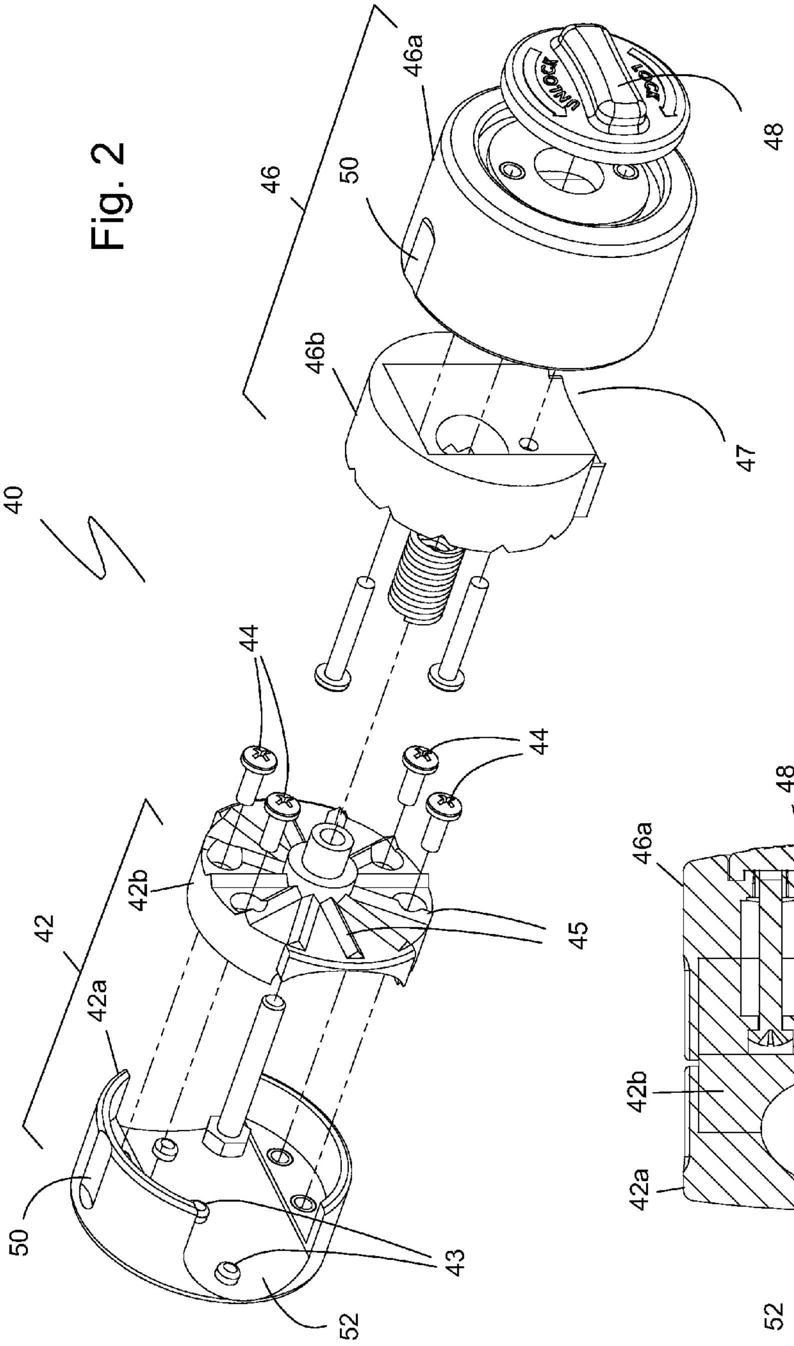
FIG. 2 is an enlarged, expanded and perspective view of the knuckle clamp assembly of the present invention.

Turning now to FIG. 2, there is illustrated an exploded perspective view of a first and second knuckle clamp assembly 40. Knuckle clamp assembly 40 includes a first clamp component 42 and a second clamp component 46. Second clamp component 46 adjustably interlocks with first clamp component 42 to provide for selective circumferential positioning of second clamp component 46 relative to first clamp component 42. The inter-component lock interface may include a plurality of ridges 45 shown on the opposing surface of first clamp component 42 that mates with a plurality of elongated, complimentary recesses on the opposing surface of second clamp component 46. One or more notches 50 may also be incorporated in the outer peripheral surface of both first and second clamp components 42, 46 to indicate a preselected alignment such as the position when leg assemblies 80 are perpendicular to harness support frame 20 or other selected angle. It should be understood that any interlocking interface between the opposing surfaces of the first and second clamp components 42, 46 may be used to prevent slippage when locked into a user-selected position. It is also noted that second clamp component 46 may rotate a full 360° relative to first clamp component 42 or any subset of rotational angles less than 360°. The preferred angle of the leg assemblies 80 to the lateral supports 22, 24 when supporting an animal is in a range of about 13° to about 17° from the vertical toward the proximal end 26.

In this embodiment, first clamp component 42 includes a first clamp housing **42*a* and a first clamp interlock component 42*b*. First clamp component 42 has a lateral bore 52 to slidably receive one of first and second lateral supports 22, 24 therethrough. Lateral bore 52 includes a plurality of protrusions 43 spaced to coincide with the spacing of the adjustment apertures 31 of lateral supports 22, 24. Protrusions 43 not only provide alignment support to knuckle clamp assembly 40 when connecting it to lateral supports 22, 24 but also prevent the preferred spring button used for adjusting the length of the harness support frame to the animal from being inadvertently positioned in a button receiving aperture 31 that is inside the knuckle clamp assembly 40 and, thus, inaccessible for future adjustment without taking knuckle clamp assembly 40 apart. First clamp component 42 includes a knuckle-to-frame locking mechanism 44 to securely position first clamp component 42 in a desired location along lateral supports 22, 24. Adjustability of first clamp component 42 on lateral supports 22, 24 provides a means to improve the balance of wheelchair 10 to the animal to be supported. Second clamp component 46 includes a second clamp housing 46*a* and a second clamp interlock component 46*b*. Second claim component 46 includes a clamp recess 47 and a knuckle clamp lock mechanism 48. Clamp recess 47 receives leg assembly 80 while knuckle clamp lock mechanism 48 provides for adjustably interlocking second clamp component 46 to first clamp component 42 and providing selective circumferential positioning of second clamp component 46 relative to first clamp component 42**.

Figure 2A:
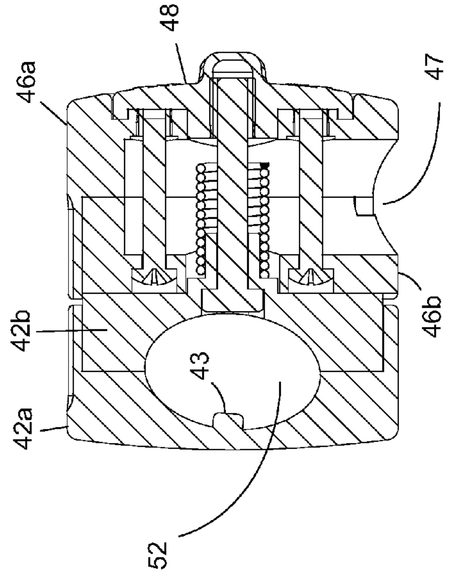
FIG. 2A is a cross-sectional view of the knuckle clamp assembly of the present invention.

FIG. 2A is a cross-sectional view of knuckle clamp assembly 40. One important aspect of knuckle clamp assembly 40 is the angled aperture 52 relative to the vertical. As explained below, it is this angle that sets the angle of the leg assembly 80 to the harness support frame 20.

Figure 3:
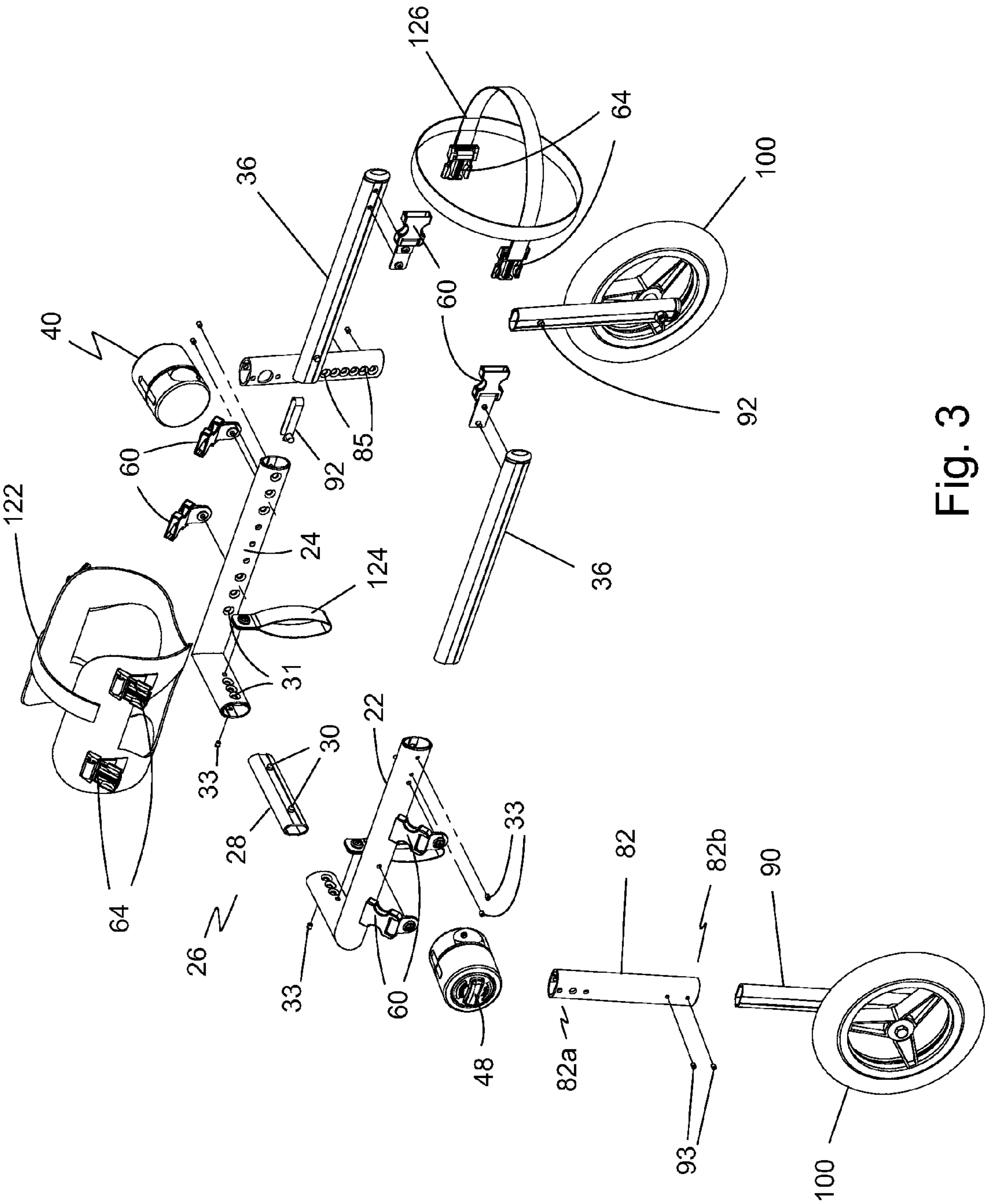
FIG. 3 is an exploded, front, perspective view of the present invention showing the components of the present invention.

Turning now to FIG. 3, there is illustrated an exploded front view of wheelchair 10. At proximal end 26, width extender 28 of harness support frame 20 is preferably telescopically connected to the first and second lateral supports 22, 24 and defines the spatial distance between first and second lateral supports 22, 24. With width extender 28, harness support frame 20 can be adjusted to accommodate various animal width sizes without having to take exact measurements of the animal to be fitted to wheelchair 10. Although the preferred embodiment shows width extender 28 telescopically received within first and second lateral supports 22, 24, first and second lateral supports 22, 24 may alternatively be received within width extender 28. It should be understood that any means other than telescopic means for adjustably connecting width extender 28 to first and second lateral supports 22, 24 may be used. A frame lock mechanism 30 is employed to securely lock width extender 28 at a pre-selected position, depending on the space between first and second lateral supports 22, 24 desired. Frame lock mechanism 30 may be a button and hole device, a twist and lock device, a collar mechanism, a locking pin, a set screw, and the like. For ease of adjustment and reliability, a button and hole device coupled with a set screw is preferably used. As shown, first and second lateral supports 22, 24 include a plurality of apertures 31 for receiving the interlocking "button." Further included are set screws 33 adjacent the junctions between first and second lateral supports 22, 24 and width extender 28 to securely lock the preselected position and prevent the inadvertent or accidental disengagement of frame lock mechanism 30. First and second lateral supports 22, 24 are preferably L-shaped, integral components but may also be an assembly of removably attachable sub-components.

The plurality of harness connectors 60 are adjustably connected on first and second lateral supports 22, 24 and are positionable, yet lockable, in various locations on harness support frame 20. A total of six to eight harness connectors 60 is typically used to support the harness assembly 120. More or less harness connectors 60, however, may be used depending on the harness configuration to be attached to the harness support frame 20 and the size of the animal to be supported. Preferably, harness connectors 60 are quick-release clips or buckles typically found on backpacks, etc., where a frame portion 62 of the clip or buckle is fastened to the harness support frame 20 and the mating harness portion 64 of the clip or buckle is fastened to the harness assembly 120. Harness connectors 60 include a locking structure that provides for fixedly securing each harness connector 60 to a pre-selected location. The locking structure may be a bolting device, a locking pin, a screw, a set screw, a rivet, and the like. The preferred method of fixedly attaching harness connectors 60 to the harness support frame 20 is to use the optional set screws 33 of the harness support frame 20.

Leg assembly 80 includes at least a leg support 82 having a leg proximal end 82*a* and a leg distal end 82*b*. Leg support 82 may optionally include a plurality of longitudinally-spaced apertures 85. Leg proximal end 82*a* is removably connected to and received into clamp recess 47. An optional leg extender 90 is telescopically received by leg distal end 82*b* and adjustably connected to leg support 82. When optional leg extender 90 is included, a leg lock mechanism 92 is employed to selectively fix the length of leg assembly 80 and securely hold leg extender 90 at a pre-selected extension. As with the lateral supports, leg lock mechanism 92 may be a button and hole device, a twist and lock mechanism, a locking pin, a collar mechanism, a set screw, and the like. In the preferred embodiment, leg extender 90 has a push button that engages one of the plurality of leg apertures 85. When optional leg extender 90 is not included, leg support 82 may incorporate a plurality of axle apertures to adjustably attach wheels 100. Wheels 100 are mounted on individual axles 102 adjacent the leg distal end 84.

Figure 4:
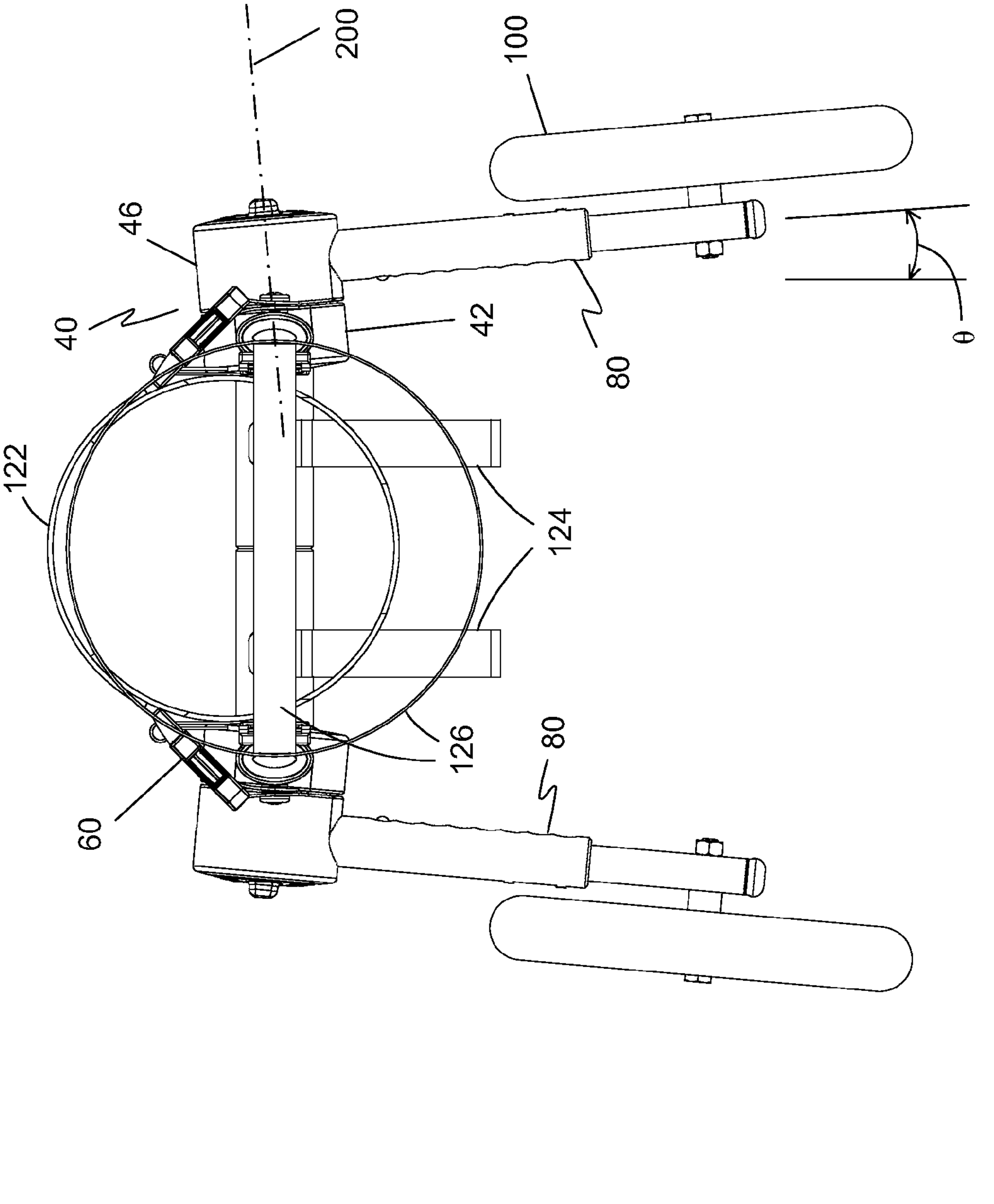
FIG. 4 is a front end view of the present invention showing the angle θ to the vertical of the leg assemblies.

FIG. 4 illustrates a front view of wheelchair 10. Leg assemblies 80 are attached to second clamp components 46 and are shown extending at a downward angle θ to the outside of harness support frame 20. The angle θ is preferably in the range of 0° to about 10° from the vertical. More preferably, the angle is 5°. In the preferred embodiment, the angle θ to the leg assemblies 80 relative to the first and second lateral supports 22, 24 is provided by forming the lateral support bore 52 in first clamp component 42 at the desired angle relative to the knuckle clamp longitudinal axis 200. This was more clearly shown in FIG. 2A. It is understood that the clamp recess 47 may alternatively be formed in second clamp component 46 at the desired angle relative to knuckle clamp longitudinal axis 200.

Figure 5:
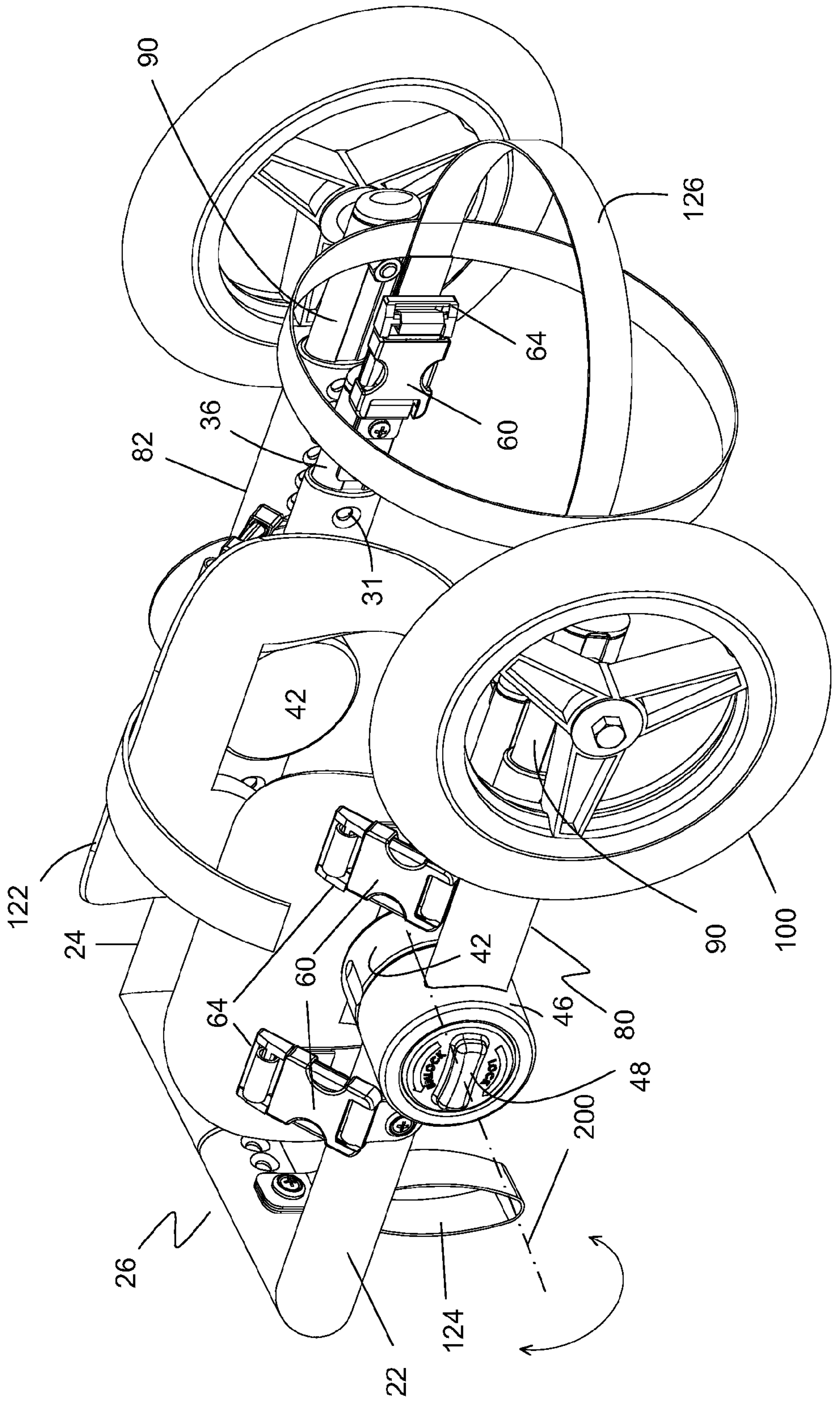
FIG. 5 is a perspective front view of the present invention showing an adjustable wheelchair for animals in a collapsed position for transport.

Turning now to FIG. 5, there is illustrated wheelchair 10 in a collapsed/folded position. In the fully collapsed position, first and second lateral supports 22, 24 are in their closest spatial arrangement at proximal end 26. Lateral extenders 36 are fully retracted relative to first and second lateral supports 22, 24. Leg extenders 90 are also in their fully retracted position relative to leg assemblies 80. In addition, leg assemblies 80 are rotated to a position where leg assemblies 80 are parallel to first and second lateral supports 22, 24. It should be noted that the extenders do not have to be in their fully retracted position to place wheelchair 10 in the collapsed/folded position. It is only recommended when it is desired that wheelchair 10 be in its most compact configuration for transport. In this preferred embodiment, knuckle clamp assembly 40 has a dial-type knuckle lock mechanism 48 that is rotatable between a locked position and an unlocked position. Knuckle lock mechanism 48 releases second clamp component 46 from its interlocking engagement with first clamp component 42. Once released, second clamp component 46 can be rotated about the knuckle longitudinal axis 200 and then re-engaged with first clamp component 42 to secure wheelchair 10 for transport.

Figure 6A:
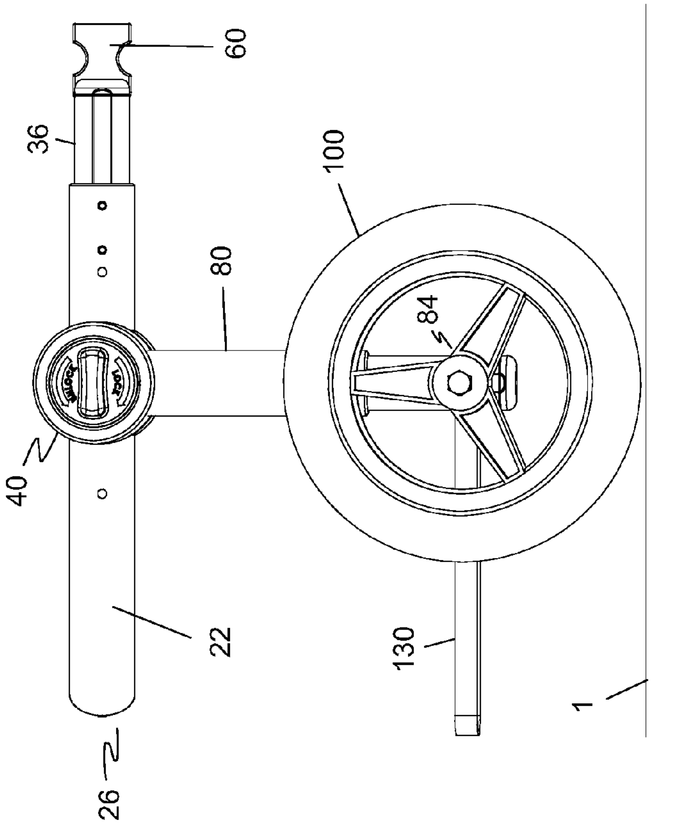
FIGS. 6A and 6B are side views of the present invention showing a stability extension on a leg of the present invention situated on a surface.
Figure 6B:
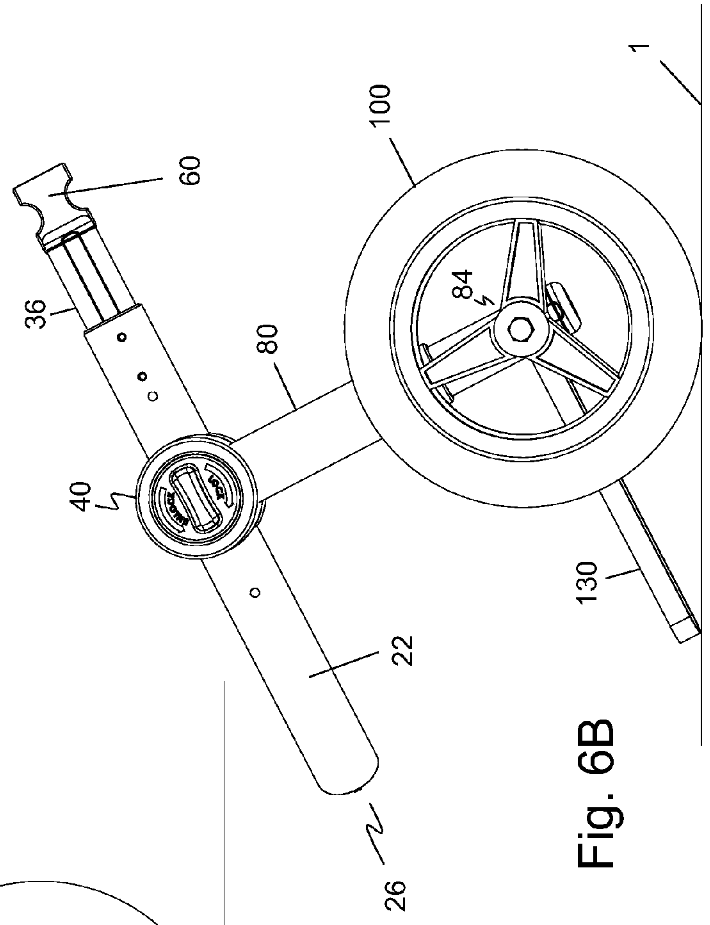

FIGS. 6A and 6B are side views of wheelchair 10 without the harness assembly 120 but showing the optional foot stabilizer 130. Optional foot stabilizer 130 is connected near the distal end 85 of leg assembly 80 and preferably extends towards the back of wheelchair 10. Foot stabilizer 130 prevents wheelchair 10 from over-rotating about wheels 100 such that harness frame distal end 26 would contact the ground 1 but for foot stabilizer 130. This is more clearly shown in FIG. 6B. Because an animal harnessed to wheelchair 10 can also sit while attached to wheelchair 10, optional foot stabilizer 130 prevents any inadvertent backward tipping of the cart caused by the animal's movement to a sitting position, which could lead to injury to the attached animal since the animal already has limited use of its hindquarters.

Figure 7:
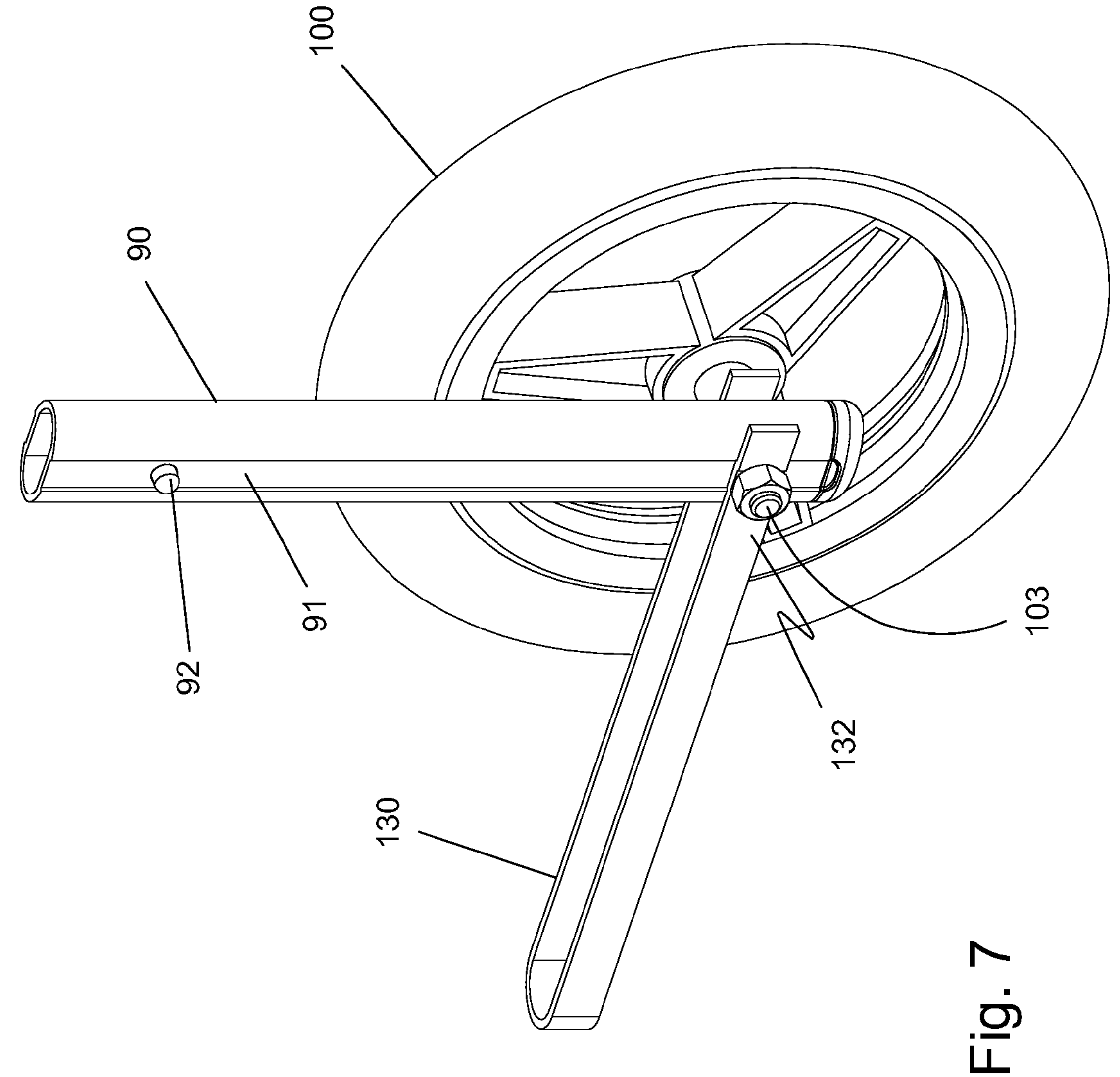
FIG. 7 is a magnified view of the stability extension shown in FIGS. 6A and 6B.

FIG. 7 is an enlarged, perspective view of foot stabilizer 130. In this embodiment, foot stabilizer 130 is shown as a U-shaped bar having a foot proximal end 132 connected to leg extension 90 at the wheel connection 103. FIG. 7 also more clearly shows another feature of leg extension 90. In the preferred embodiment, leg extension 90 is an elongated tube having a channel 91 longitudinally extending along the length of one or both opposed sides of leg extension 90. Channel 91 engages with a mating structure on the inside of leg support 82, which also extends along the length of leg support 82. This structural configuration facilitates alignment of the push button with the sizing apertures 85 in leg support 82. The flat surface of the channel also provides a surface for the optional set screws 93. Width extender 28 and lateral extenders 36 may also optionally have the same or similar structure, which facilitates alignment of the push button in lateral extenders 36 and width extender 28 with the sizing apertures 31 in the lateral supports 22, 24.

Figure 8:
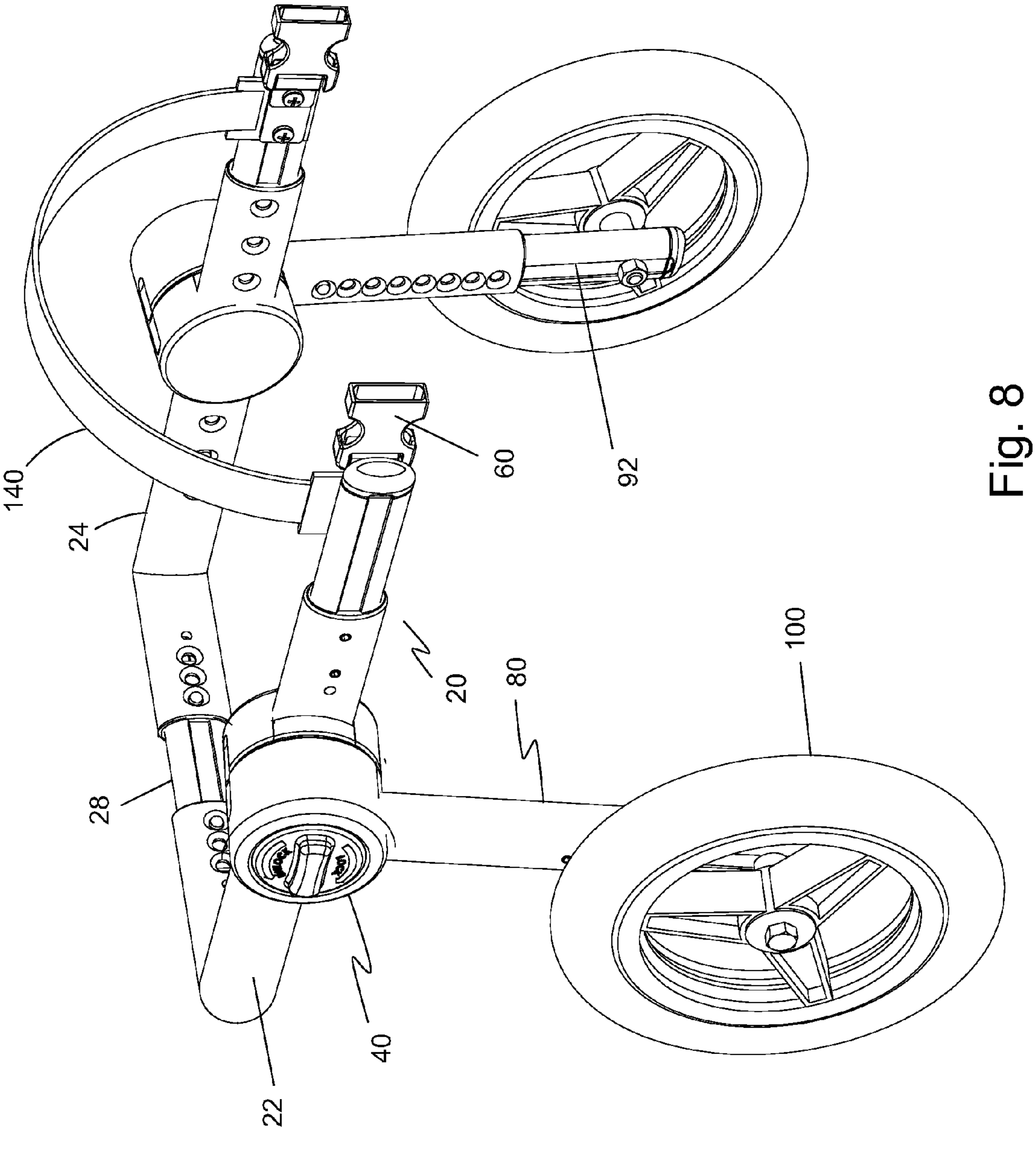
FIG. 8 is a perspective view of the present invention without the harness assembly showing a front stabilizer bar.

Turning now to FIG. 8, there is shown a perspective view of wheelchair 10 without harness assembly 120 and another optional feature. Harness support frame 20 may also include an optional stabilizer bar 140. Stabilizer bar 40 is preferably removably, but securely, attached to lateral extenders 22, 24 and extends above the plane of harness support frame 20. Stabilizer bar 40 has several purposes. It stabilizes lateral extenders 22, 24 about the animal when the harness assembly 120 is attached to the animal and it also provides a handle for the animal's keeper to assist the animal is difficult situations.

Figure 9:
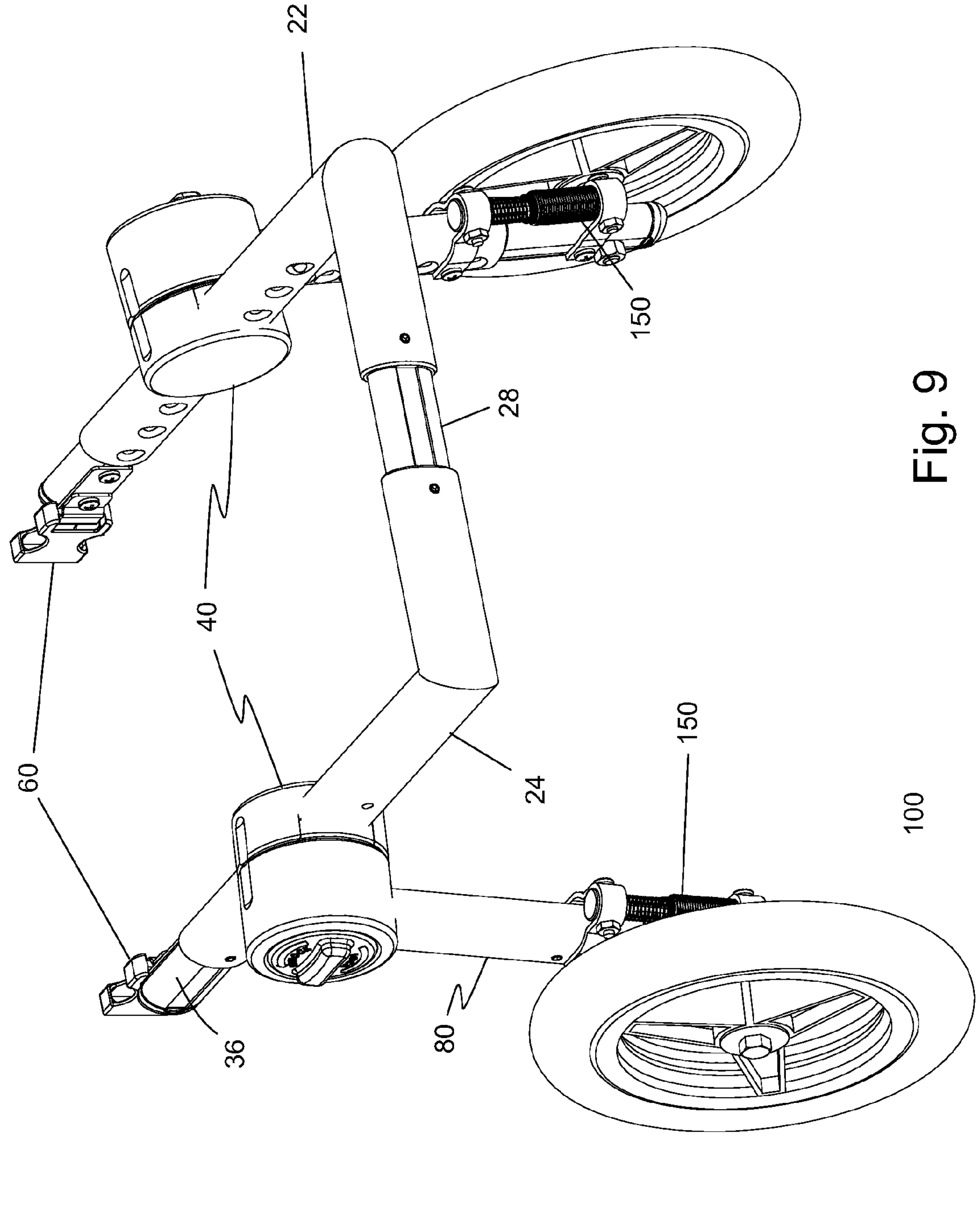
FIG. 9 is a perspective rear view of the present invention showing optional shock absorbers on the wheeled legs.

Turning now to FIG. 9, there is yet shown another optional feature of the present invention. FIG. 9 is a rear perspective view of the wheelchair 10 with an optional shock absorber 150 on each leg assembly 80. The use of optional shock absorber 150 eliminates the need for adjustment mechanism 92 or optional set screw 93. Shock absorber 150 provides for a less jarring experience for the animal harnessed into wheelchair 10. It should be understood that shock absorber 150 made be incorporated in any position on leg assembly 80 so long as it provides shock absorbing characteristics between wheel 100 and leg support 82. Particularly, shock absorber 150 may be configured internally within leg assembly 80 instead of externally as shown in FIG. 9.

Figure 10:
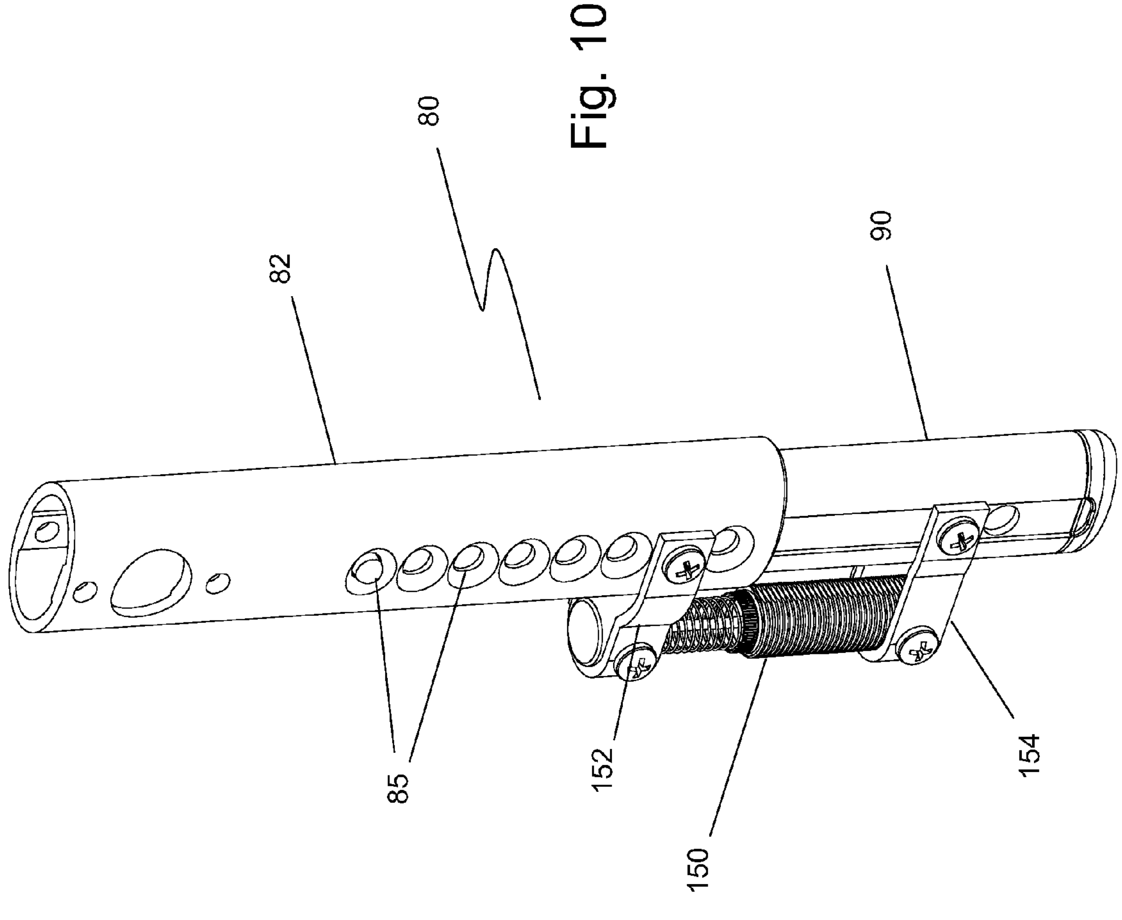
FIG. 10 is an enlarged perspective view of one leg of the present invention showing the shock absorber.

FIG. 10 is an enlarged perspective view of leg assembly 80 showing shock absorber 150. In this particular embodiment, shock absorber 150 is externally configured to leg assembly 80 and has a first and second absorber support 152 and 154, respectively. First absorber support 152 securely attaches one end of shock absorber 150 to leg support 82 and second absorber support 154 securely attaches the other end of shock absorber 150 to leg extension 90.

The total adjustability feature of wheelchair 10 eliminates the need for a user to take careful measurements of the animal's length, width and height. The user only needs to know the animal's relative size, i.e. small, medium or large or other designation, in order to obtain a wheelchair 10 that is designed to be adjustable for the animal's true size. After having received wheelchair 10, the user can easily make the final sizing adjustments for the user's animal.

Typically, wheelchair 10 is in the collapsed position for transport as shown in FIG. 5. Wheelchair 10 is opened from the collapsed position by unlocking knuckle lock mechanism 48 on each knuckle clamp assembly 40 and rotating leg assembly 80 to the position that is perpendicular to harness support frame 20. Once leg assembly 80 is in position, knuckle lock mechanism 48 is re-locked to secure leg assembly 80 into position. Leg assembly 80 may be perpendicular to the harness support frame 20 or, preferably, set to an angle as previously discussed for better stability when attached to the animal. To adjust the height of wheelchair 10 relative to the animal, leg lock mechanism 92 is disengaged and leg extender 90 is extended to a second position where leg lock mechanism 92 is re-engaged such that the harness support frame is positioned for the height of the animal to be supported.

Next, the width of the harness support frame is adjusted for the width of the animal. The frame lock mechanism is disengaged from the first and second lateral supports 22, 24 and first and second lateral supports 22, 24 are adjusted by separating first and second lateral supports 22, 24 from each other along the width extender 28 to the width of the animal to be supported. Once the proper width/spacing between first and second lateral supports 22, 24 is achieved, frame lock mechanism is re-engaged. If the length of harness support frame 20 needs to be adjusted, then the lateral lock mechanism is disengaged and lateral extenders 36 are extended the desired distance for the length of the animal to be supported. The lateral lock mechanism is then re-engaged. The harness assembly 120 is removably attached to the animal and then connected to the plurality of harness connectors 60 on harness support frame 20. Depending on the design of the harness used, the position of the plurality of harness connectors 60 may need to be re-positioned on harness support frame 20.

After use of wheelchair 10 with the animal, the user may collapse wheelchair 10 for transport. The user may either fully collapse wheelchair 10 or only rotate leg assemblies 80 to a parallel position with harness support frame 20 by unlocking the knuckle lock mechanism 48, rotating the leg assemblies 80 to the desired position and re-locking knuckle lock mechanism 48. For added security, optional set screws 33 on harness support frame 20 and optional set screws 93 on leg assemblies 80 may be engaged to further secure the positions of the width extender 28, lateral extenders 36 and leg extenders 90.

Many advantages of the present invention have been disclosed. These include eliminating the need for custom designing a wheelchair/cart for a particular animal, eliminating the need to take accurate measurements of the animal's length, height and width, provides re-usability of an animal wheelchair for differently sized animals, eliminates the need for replacing the animal wheelchair if the animal outgrows the wheelchair, and provides collapsibility for easier transport.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A wheelchair for animals comprising:

a harness support frame having first and second lateral supports spaced from each other and a width extender adjustably connected between the first and second lateral supports;

first and second knuckle clamp assemblies wherein each one of the first and second knuckle clamp assemblies has a first clamp component and a second clamp component, each first clamp component having a lateral bore for receiving one of the first and second lateral supports therethrough and positioned between a support frame proximal end and a support frame distal end, and each second clamp component being rotatably and adjustably connected to the corresponding first clamp component and having a clamp recess;

a plurality of harness connectors removably attached to the harness support frame and positionable along the first and second lateral supports;

first and second leg assemblies wherein each clamp recess of the second clamp components receives a leg assembly proximal end of one of the first and second leg assemblies;

first and second wheels wherein each one of the first and second wheels is rotatably connected to separate axles positioned in a pre-selected aperture of the first and second leg assemblies adjacent to a leg assembly distal end of the first and second leg assemblies; and a harness assembly detachably connected to the harness support frame.

2. The wheelchair of claim 1 wherein the harness support frame further includes first and second lateral extenders telescopically and adjustably connected to corresponding first and second lateral supports at the support frame distal end.

3. The wheelchair of claim 1 wherein the width extender is telescopically and adjustably connected to the first and second lateral supports at the support frame proximal end.

4. The wheelchair of claim 1 wherein the first and second leg assemblies include a leg extender telescopically and adjustably connected to each of the first and second leg assemblies at the leg assembly distal end.

5. The wheelchair of claim 4 wherein the first and second wheels are rotatably connected to the leg extender of each of the first and second leg assemblies.

6. The wheelchair of claim 1 wherein the first and second leg assemblies have an outward extending angle in the range of 0° to about 10°.

7. The wheelchair of claim 1 wherein the second clamp component rotates 360° relative to the first clamp component.

8. The wheelchair of claim 7 wherein the second clamp component rotates through a predefined angle less than 360° relative to the first clamp component.

9. The wheelchair of claim 1 wherein the first clamp component and the second clamp component have an interlocking mechanism for adjustably setting the circumferential position of the second clamp component to the first clamp component.

10. The wheelchair of claim 2 further comprising a lateral lock mechanism to fix the lateral extender of the first and second lateral supports to a user-selected extended position.

11. The wheelchair of claim 3 further comprising a frame lock mechanism to fix the width extender to the first and second lateral supports to a user-selected spacing between the first and second lateral supports.

12. The wheelchair of claim 1 wherein the first and second knuckle clamp assemblies are positionably adjustable along the first and second lateral supports.

13. The wheelchair of claim 1 further comprising a foot stabilizer connected to the distal end of the leg assembly and extending a predefined distance away from the leg assembly.

14. The wheelchair of claim 4 further comprising a shock absorber connected to the leg support on one end and to the leg extension on the other end.

15. The wheelchair of claim 1 further comprising a stabilizer bar connected above and between the first and second lateral supports adjacent a distal end of the harness support frame.

* * * * *